(12) United States Patent
Wilczynski

(10) Patent No.: US 11,280,626 B2
(45) Date of Patent: Mar. 22, 2022

(54) SYSTEMS AND METHODS FOR ALTERNATIVE PROJECTIONS OF GEOGRAPHICAL INFORMATION

(71) Applicant: Palantir Technologies Inc., Palo Alto, CA (US)

(72) Inventor: Peter Wilczynski, San Francisco, CA (US)

(73) Assignee: Palantir Technologies Inc., Palo Alto, CA (US)

(*) Notice: Subject to any disclaimer, the term of this patent is extended or adjusted under 35 U.S.C. 154(b) by 0 days.

(21) Appl. No.: 17/090,851

(22) Filed: Nov. 5, 2020

(65) Prior Publication Data

US 2021/0080275 A1    Mar. 18, 2021

Related U.S. Application Data

(63) Continuation of application No. 16/028,185, filed on Jul. 5, 2018, now Pat. No. 10,830,599.
(Continued)

(51) Int. Cl.
*G01C 21/34* (2006.01)
*G06K 9/00* (2006.01)
(Continued)

(52) U.S. Cl.
CPC ..... *G01C 21/3461* (2013.01); *G01C 21/3476* (2013.01); *G01C 21/367* (2013.01);
(Continued)

(58) Field of Classification Search
None
See application file for complete search history.

(56) References Cited

U.S. PATENT DOCUMENTS

| 4,899,161 A | 2/1990 | Morin, Jr. et al. |
| 4,958,305 A | 9/1990 | Piazza |

(Continued)

FOREIGN PATENT DOCUMENTS

| AU | 2012216622 | 4/2013 |
| DE | 102013222023 A1 | 1/2015 |

(Continued)

OTHER PUBLICATIONS

Author Unknown, "Creating a Store Locator on Google Maps", published on Sep. 25, 2017, retrieved from https://web.archive.org/web/20170925220702/https://developers.google.com/maps/solutions/store-locator/clothing-store-locator on Sep. 30, 2019.*

(Continued)

*Primary Examiner* — Frank S Chen
(74) *Attorney, Agent, or Firm* — Sheppard Mullin Richter & Hampton LLP

(57) ABSTRACT

A method is provided for determining angular relationships from a point of interest to a plurality of peripheral points of interest on a map. One or more cost functions from the point of interest to the plurality of the peripheral points of interest on the map are analyzed. A plurality of vectors emanating from the point of interest to the plurality of the peripheral points of interest on a different representation of the map are displayed. Another method is provided for identifying points of interest on a map. Regions of high interest are identified on the map. Regions of low interest are identified on the map. The regions of high interest are expanded on a different representation of the map. The regions of low interest are contracted by an amount proportional to an amount the regions of high interest are expanded on the different representation of the map.

20 Claims, 10 Drawing Sheets

Related U.S. Application Data

(60) Provisional application No. 62/651,889, filed on Apr. 3, 2018.

(51) Int. Cl.
  *G06T 3/40* (2006.01)
  *G06T 11/60* (2006.01)
  *G01C 21/36* (2006.01)
  *G09B 29/10* (2006.01)
  *G09B 29/00* (2006.01)
  *G06F 3/0482* (2013.01)

(52) U.S. Cl.
  CPC ..... *G01C 21/3682* (2013.01); *G06K 9/00476* (2013.01); *G06T 3/40* (2013.01); *G06T 11/60* (2013.01); *G09B 29/005* (2013.01); *G09B 29/106* (2013.01); *G06F 3/0482* (2013.01)

(56) References Cited

U.S. PATENT DOCUMENTS

| | | |
|---|---|---|
| 5,329,108 A | 7/1994 | Lamoure |
| 5,754,182 A | 5/1998 | Kobayashi |
| 5,781,195 A | 7/1998 | Marvin |
| 5,781,704 A | 7/1998 | Rossmo |
| 6,091,956 A | 7/2000 | Hollenberg |
| 6,157,747 A | 12/2000 | Szeliski et al. |
| 6,169,552 B1 | 1/2001 | Endo et al. |
| 6,173,067 B1 | 1/2001 | Payton et al. |
| 6,178,432 B1 | 1/2001 | Cook et al. |
| 6,247,019 B1 | 6/2001 | Davies |
| 6,389,289 B1 | 5/2002 | Voce et al. |
| 6,414,683 B1 | 7/2002 | Gueziec |
| 6,483,509 B1 | 11/2002 | Rabenhorst |
| 6,516,268 B2 | 2/2003 | Ruiz et al. |
| 6,529,900 B1 | 3/2003 | Patterson et al. |
| 6,631,496 B1 | 10/2003 | Li et al. |
| 6,662,103 B1 | 12/2003 | Skolnick et al. |
| 6,744,434 B2 | 6/2004 | Kindratenko et al. |
| 6,757,445 B1 | 6/2004 | Knopp |
| 6,828,920 B2 | 12/2004 | Owen et al. |
| 6,958,753 B2 | 10/2005 | Abe |
| 6,983,203 B1 | 1/2006 | Wako |
| 6,985,950 B1 | 1/2006 | Hanson et al. |
| 7,036,085 B2 | 4/2006 | Barros |
| 7,051,291 B2 | 5/2006 | Sciammarella et al. |
| 7,076,741 B2 | 7/2006 | Miyaki |
| 7,158,878 B2 | 1/2007 | Rasmussen et al. |
| 7,375,732 B2 | 5/2008 | Aguera Y Arcas |
| 7,379,811 B2 | 5/2008 | Rasmussen et al. |
| 7,457,706 B2 | 11/2008 | Melero et al. |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,617,314 B1 | 11/2009 | Bansod et al. |
| 7,620,628 B2 | 11/2009 | Kapur et al. |
| 7,663,621 B1 | 2/2010 | Allen et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,920,963 B2 | 4/2011 | Jouline et al. |
| 7,945,852 B1 | 5/2011 | Piiskalns |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,065,080 B2 | 11/2011 | Koch |
| 8,085,268 B2 | 12/2011 | Carrino et al. |
| 8,134,457 B2 | 3/2012 | Velipasalar et al. |
| 8,145,703 B2 | 3/2012 | Frishert et al. |
| 8,200,676 B2 | 6/2012 | Frank |
| 8,214,361 B1 | 7/2012 | Sandler et al. |
| 8,214,764 B2 | 7/2012 | Gemmell et al. |
| 8,229,947 B2 | 7/2012 | Fujinaga |
| 8,230,333 B2 | 7/2012 | Decherd et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,325,178 B1 | 12/2012 | Doyle, Jr. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,412,234 B1 | 4/2013 | Gatmir-Motahar et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,660,869 B2 | 2/2014 | MacIntyre et al. |
| 8,742,934 B1 | 6/2014 | Sarpy, Sr. et al. |
| 8,781,169 B2 | 7/2014 | Jackson et al. |
| 8,799,799 B1 | 8/2014 | Cervelli et al. |
| 8,830,322 B2 | 9/2014 | Nerayoff et al. |
| 8,938,686 B1 | 1/2015 | Erenrich et al. |
| 8,949,164 B1 | 2/2015 | Mohler |
| 8,983,494 B1 | 3/2015 | Onnen et al. |
| 9,009,177 B2 | 4/2015 | Zheng et al. |
| 9,021,384 B1 | 4/2015 | Beard et al. |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,129,219 B1 | 9/2015 | Robertson et al. |
| 9,146,125 B2 | 9/2015 | Vulcano et al. |
| 9,280,618 B1 | 3/2016 | Bruce et al. |
| 2002/0130867 A1 | 9/2002 | Yang et al. |
| 2003/0052896 A1 | 3/2003 | Higgins et al. |
| 2003/0163352 A1 | 8/2003 | Surpin |
| 2003/0225755 A1 | 12/2003 | Iwayama et al. |
| 2004/0030492 A1 | 2/2004 | Fox et al. |
| 2004/0039498 A1 | 2/2004 | Ollis et al. |
| 2004/0098236 A1 | 5/2004 | Mayer et al. |
| 2005/0031197 A1 | 2/2005 | Knopp |
| 2005/0034062 A1 | 2/2005 | Bufkin et al. |
| 2005/0080769 A1 | 4/2005 | Gemmell et al. |
| 2005/0143602 A1 | 6/2005 | Yada et al. |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0223044 A1 | 10/2005 | Ashworth et al. |
| 2005/0267652 A1 | 12/2005 | Allstadt et al. |
| 2006/0026170 A1 | 2/2006 | Kreitler et al. |
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0251307 A1 | 11/2006 | Florin et al. |
| 2006/0259527 A1 | 11/2006 | Devarakonda et al. |
| 2006/0267803 A1 | 11/2006 | Mathis et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott et al. |
| 2007/0115373 A1 | 5/2007 | Gallagher et al. |
| 2007/0188516 A1 | 8/2007 | Ioup et al. |
| 2007/0208497 A1 | 9/2007 | Downs et al. |
| 2007/0208498 A1 | 9/2007 | Barker et al. |
| 2007/0258642 A1 | 11/2007 | Thota |

(56) References Cited

U.S. PATENT DOCUMENTS

| | | |
|---|---|---|
| 2007/0294643 A1 | 12/2007 | Kyle |
| 2008/0010605 A1 | 1/2008 | Frank |
| 2008/0040684 A1 | 2/2008 | Crump |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao et al. |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shimasaki et al. |
| 2009/0132921 A1 | 5/2009 | Hwangbo et al. |
| 2009/0132953 A1 | 5/2009 | Reed, Jr. et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikall et al. |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0225756 A1 | 9/2010 | Miyata |
| 2010/0277611 A1 | 11/2010 | Holt et al. |
| 2010/0293174 A1 | 11/2010 | Bennett et al. |
| 2010/0321399 A1 | 12/2010 | Eliren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuor et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0066550 A1 | 3/2013 | Takada |
| 2013/0073377 A1 | 3/2013 | Heath |
| 2013/0076732 A1 | 3/2013 | Cervelli et al. |
| 2013/0093787 A1 | 4/2013 | Fulks et al. |
| 2013/0100134 A1 | 4/2013 | Cervelli et al. |
| 2013/0101159 A1 | 4/2013 | Chao et al. |
| 2013/0132398 A1 | 5/2013 | Pfeifle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg et al. |
| 2014/0071170 A1 | 3/2014 | Kroeber |
| 2014/0176606 A1 | 6/2014 | Narayan et al. |
| 2014/0218400 A1 | 8/2014 | O'Toole et al. |
| 2014/0333651 A1 | 11/2014 | Cervelli et al. |
| 2014/0337772 A1 | 11/2014 | Cervelli et al. |
| 2014/0361899 A1 | 12/2014 | Layson |
| 2015/0029176 A1 | 1/2015 | Baxter et al. |
| 2015/0100907 A1 | 4/2015 | Erenrich et al. |
| 2015/0106170 A1 | 4/2015 | Bonica |
| 2015/0145865 A1 | 5/2015 | Barnett et al. |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0312323 A1 | 10/2015 | Peterson |
| 2015/0338233 A1 | 11/2015 | Cervelli et al. |
| 2015/0379413 A1 | 12/2015 | Robertson et al. |
| 2016/0018240 A1 | 1/2016 | Kritt et al. |
| 2016/0054137 A1 | 2/2016 | Wheatman et al. |
| 2016/0180561 A1 | 6/2016 | Dobrowolski |
| 2017/0059339 A1 | 3/2017 | Sugawara et al. |
| 2017/0322942 A1* | 11/2017 | Duda ................ H04L 67/18 |
| 2019/0178657 A1 | 6/2019 | Benbrahim et al. |

FOREIGN PATENT DOCUMENTS

| | | |
|---|---|---|
| EP | 0763201 A1 | 3/1997 |
| EP | 2575107 A2 | 4/2013 |
| EP | 2858014 A2 | 4/2015 |
| EP | 2963595 A1 | 1/2016 |
| GB | 2516155 A | 1/2015 |
| NL | 2012778 A | 11/2014 |
| NZ | 624557 A | 8/2014 |
| WO | 9532424 A1 | 11/1995 |
| WO | 0009529 A2 | 2/2000 |
| WO | 0198925 A2 | 12/2001 |
| WO | 2004057268 A2 | 7/2004 |
| WO | 2005013200 A1 | 2/2005 |
| WO | 2008064207 A2 | 5/2008 |
| WO | 2009061501 A1 | 5/2009 |
| WO | 2009123975 A1 | 10/2009 |
| WO | 2011058507 A1 | 5/2011 |

OTHER PUBLICATIONS

Geoffrey Ives, "How to Create a Concentric Circle Map," published on May 3, 2017, retrieved from https://www.mapbusinessonline.com/blog/2017/05/03/creat-concentric-circle-map/ on Dec. 17, 2019.*

"A First Look: Predicting Market Demand for Food Retail using a Huff Analysis," TRF Policy Solutions, Jul. 2012, p. 30.

"Andy Turner's GISRUK 2012 Notes" <https://docs.google.com/document/d/1cTmxg7mVx5gd89lqblCYvCEnHA4QAivH4-l4WpyPsqE4/edit?pli=1> printed Sep. 16, 2013 in 15 pages.

"HunchLab: Heat Map and Kernel Density Calculation for Crime Analysis," Azavea Journal, printed from www.azavea.com/blogs/newsletter/v4i4/kernel-density-capabilities-added-to--hunchlab/ on Sep. 9, 2014, 2 pages.

Author Unknown, "Curved point-to-point 'route maps'", published in 2011, retrieved from https://gis.stackexchange.com/questions/5204/curved-point-to-point-route-- maps on Sep. 30, 2019.

Barnes et al., "Viewshed Analysis", GIS-ARC/INFO 2001, <www.evsc.virginia.edu/.about.jhp7e/evs466/studentpres/Rounds.odf>-.

(56) References Cited

OTHER PUBLICATIONS

Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, p. 6.
Chen et al., "Bringing Order to the Web: Automatically Categorizing Search Results," CHI 2000, Proceedings of the SiGCHI conference on Human Factors in Computing Systems, Apr. 1-6, 2000, The Hague, The Netherlands, pp. 145-152.
Definition "Identify", downloaded Jan. 22, 2015, 1 page.
Definition "Overlay", downloaded Jan. 22, 2015, 1 page.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-th-e-huff-model/123411.
Extended European Search Report for EP Appln. No. 19166639.5 dated Nov. 21, 2019, 11 pages.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public_ Department of Regional Planning. Planning & Zoning Information for Unincorporated LA County. Retrieved Oct. 2, 2013 from http://gis.planning.lacounty.gov/GIS-NET3_Public/Viewer.html.
Gorr et al., "Crime Hot Spot Forecasting: Modeling and Comparative Evaluation", Grant 98-IJ-CX-K005, May 6, 2002, 37 pages.
Griffith, Daniel A., "A Generalized Huff Model," Geographical Analysis, Apr. 1982, vol. 14, No. 2, pp. 135-144.
Haralick et al., "image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context., Mar. 18, 2011, pp. 16.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, p. 33.
Huff, David L., "Parameter Estimation in the Huff Model," ESRI, ArcUser, Oct.-Dec. 2003, pp. 34-36.
Ipbucker, C., "Inverse Transformation for Several Pseudo-cylindrical Map Projections Using Jacobian Matrix," ICCSA 2009, Part 1 LNCS 5592, pp. 553-564.
Issue Notification for U.S. Appl. No. 13/917,571 dated Aug. 5, 2014.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Mandagere, Nagapramod, "Buffer Operations in GIS," <http://www-users.cs.umn.edu/.about.npramod/enc_pdf.pdf> retrieved Jan. 28, 2010, pp. 7.
Map Builder, "Rapid Mashup Development Tool for Google and Yahoo Maps!" <http://web.archive.org/web/20090626224734/http://www.mapbuilder.net/&- gt; printed Jul. 20, 2012 in 2 pages.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Murray, C., Oracle Spatial Developer's Guide-6 Coordinate Systems (Spatial Reference Systems), <http://docs.oracle.com/cd/B28359_01/appdev.111/b28400.pdf>, Jun. 2009.
Notice of Acceptance for Australian Patent Application No. 2012216622 dated Jan. 6, 2015.
Notice of Allowance for U.S. Appl. No. 13/728,879 dated Apr. 6, 2015.
Notice of Allowance for U.S. Appl. No. 13/728,879 dated Jun. 21, 2016.
Notice of Allowance for U.S. Appl. No. 13/948,859 dated Dec. 10, 2014.
Notice of Allowance for U.S. Appl. No. 14/319,161 dated Dec. 29, 2014.
Notice of Allowance for U.S. Appl. No. 14/319,161 dated May 4, 2015.
Notice of Allowance for U.S. Appl. No. 14/730,123 dated Apr. 12, 2016.
Official Communication for Australian Patent Application No. 2014202442 dated Mar. 19, 2015.
Official Communication for Australian Patent Application No. 2014213553 dated May 7, 2015.
Official Communication for European Patent Application No. 14187739.9 dated Jul. 6, 2015.
Official Communication for Great Britain Patent Application No. 1408025.3 dated Nov. 6, 2014.
Official Communication for Netherlands Patent Application No. 2011632 dated Feb. 8, 2016.
Official Communication for Netherlands Patent Application No. 2012778 dated Sep. 22, 2015.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/840,673 dated Jan. 2, 2015.
Official Communication for U.S. Appl. No. 12/840,673 dated Sep. 17, 2014.
Official Communication for U.S. Appl. No. 13/728,879 dated Aug. 12, 2015.
Official Communication for U.S. Appl. No. 13/728,879 dated Jan. 27, 2015.
Official Communication for U.S. Appl. No. 13/728,879 dated Mar. 17, 2015.
Official Communication for U.S. Appl. No. 13/728,879 dated Nov. 20, 2015.
Official Communication for U.S. Appl. No. 14/289,596 dated Apr. 30, 2015.
Official Communication for U.S. Appl. No. 14/289,596 dated Jan. 26, 2015.
Official Communication for U.S. Appl. No. 14/289,596 dated Jul. 18, 2014.
Official Communication for U.S. Appl. No. 14/289,596 dated May 9, 2016.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/294,098 dated Sep. 4, 2015.
Official Communication for U.S. Appl. No. 14/294,098 dated Aug. 15, 2014.
Official Communication for U.S. Appl. No. 14/294,098 dated Nov. 6, 2014,.
Official Communication for U.S. Appl. No. 14/490,612 dated Jan. 23, 2015.
Official Communication for U.S. Appl. No. 14/490,612 dated Aug. 18, 2015.
Official Communication for U.S. Appl. No. 14/730,123 dated Sep. 21, 2015.
Official Communication for U.S. Appl. No. 14/929,584 dated Feb. 4, 2016.
Official Communication for U.S. Appl. No. 14/934,004 dated May 25, 2016.
Official Communication for U.S. Appl. No. 14/934,004 dated Feb. 16, 2016.
Open Street Map, "Amm's Diary:Unconnected ways and other data quality issues," http://www.openstreetmap.org/user/arr/diary printed Jul. 23, 2012 in 3 pages.

(56) References Cited

OTHER PUBLICATIONS

POI Editor, "How to: Create Your Own Points of interest," <http://www.poieditor.com/articles/how_to create_your_own_points_of_interest/> printed Jul. 22, 2012 in 4 pages.

Pozzi et al., "Vegetation and Population Density in Urban and Suburban Areas in the U.S.A." Third International Symposium of Remote Sensing of Urban Areas Istanbul, Turkey, Jun. 2002, pp. 8.

Qiu, Fang, "3d Analysis and Surface Modeling", <http://web.archive.org/web/20091202221925/http://www.utsa.edu/Irsg/Te- aching/EES6513/08-3D.pdf> printed Sep. 16, 2013 in 26 pages.

Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.

Reibel et al., "Areal Interpolation of Population Counts Using Pre-classi_ed Land Cover Data," Population Research and Policy Review, 2007, vol. 26, pp. 619-633.

Reibel, M., "Geographic information Systems and Spatial Data Processing in Demography: a Review," Population Research and Policy Review, 2007, vol. 26, pp. 601-618.

Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.

Snyder, "Map Projections—A Working Manual," U.S. Geological Survey Professional paper 1395, United States Government Printing Office, Washington: 1937, pp. 11-21 and 60-70.

Sonris, "Using the Area of Interest Tools," <http://web.archive.org/web/20061001053327/http://sonris-www.dnr.state-la.us/gis/instruct_files/tutslide12> printed Jan. 3, 2013 in 1 page.

Tangelder et al., "Freeform Shape Matching Using Minkowski Operations," The Netherlands, Jun. 1996, pp. 12.

Thompson, Mick, "Getting Started with GEO," Getting Started with GEO, Jul. 26, 2011.

Valentini et ai., "Ensembles of Learning Machines", M. Marinaro and R. Tagliaferri (Eds.): WIRN VIETRI 2002, LNCS 2436, pp. 3-20.

VB Forums, "Buffer a Polygon," Internet Citation, <http://www.vbforums.com/showthread.php7198436-Buffer-a-Polygon>, Specifically Thread #1, #5 & #11 retrieved on May 2, 2013, pp. 8.

Vivid Solutions, "JTS Topology Suite: Technical Specifications," <http://www.vividsolutions,com/jts/bin/JTS%20Technical%20Specs.pdf> Version 1.4, 2003, pp. 36.

Wikipedia, "Douglas_Peucker-Algorithms," <http://de.wikipedia.org/w/index.php?title=Douglas-Peucker-Algorithmus-&oldid=91846042> printed Jul. 2011, pp. 2.

Wikipedia, "Ramer_Douglas_Peucker Algorithm," <http://en.wikipedia.org/wiki/Ramer%E2%80%93Douglas%E2%80%93Peucker_al- gorithm> printed Jul. 2011, pp. 3.

Wongsuphasawat et al., "Visual Analytics for Transportation incident Data Sets," Transportation Research Record 2138, 2009, pp. 135-145.

Woodbridge, Stephen, "[geos-devel] Polygon simplification," <http://lists.osgeo.org/pipermail/geos-devel/2011-May/005210.htmb> dated May 8, 2011, pp. 3.

\* cited by examiner

SYSTEMS AND METHODS FOR ALTERNATIVE PROJECTIONS OF GEOGRAPHICAL INFORMATION

CROSS REFERENCE TO RELATED APPLICATIONS

This application is a continuation application of U.S. patent application Ser. No. 16/028,185, filed Jul. 5, 2018, which claims the benefit under 35 U.S.C. § 119(e) of U.S. Provisional Application Ser. No. 62/651,889, filed Apr. 3, 2018, the contents of which are hereby incorporated by reference in their entireties.

FIELD OF THE INVENTION

This disclosure relates to alternative projections of geographical information.

BACKGROUND

Maps in use today are projections of points from the three dimensional surface of the earth to a two dimensional plane. In each map projection, some geographical information is lost or distorted at the expense of preserving some other geographical information. Thus, each type of projection has limitations and may be only suitable for certain purposes.

SUMMARY

Various embodiments of the present disclosure can include methods for determining angular relationships from a point of interest to a plurality of peripheral points of interest on a map. One or more cost functions from the point of interest to the plurality of the peripheral points of interest on the map are analyzed. A plurality of vectors emanating from the point of interest to the plurality of the peripheral points of interest on a different representation of the map are displayed.

In some embodiments, the plurality of vectors comprises directions corresponding to the angular relationships from the point of interest to the plurality of the peripheral points of interests on the two dimensional map and magnitudes corresponding to the one or more cost functions associated with the point of interest to the plurality of the peripheral points of interest on the two dimensional map.

In some embodiments, the one or more cost functions are at least one of time, scenic value, road curvature, terrain difficulty, or economic incentive.

In some embodiments, the methods are configured to display one or more concentric intervals centered about the point of interest on the different representation of the two dimensional map, each concentric interval represents a unit of a measure.

In some embodiments, the one or more concentric intervals represent time intervals and the unit of the measurement is a discrete measure of time.

In some embodiments, the one or more concentric intervals represent progressive levels of scenic values and the unit of the measurement is a discrete measure of scenic value.

In some embodiments, the one or more concentric intervals represent progressive levels of road curvature and the unit of the measure is a discrete measure of road curvature.

In some embodiments, the one or more concentric intervals represent progressive levels of economic incentive and the unit of the measurement is discrete measure of economic incentives.

In some embodiments, the one or more cost function is user selectable.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
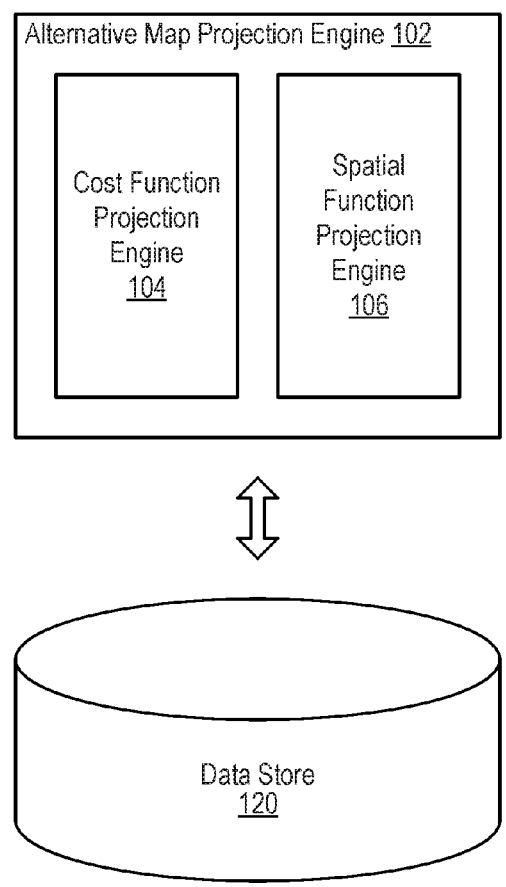
FIG. 1 illustrates an example map projection system, according to various embodiments of the present disclosure.

Maps in use today are nothing more than a two dimensional representation of a set of geographical information optimized for a certain subset of geographical information over some other subset of geographical information. For example, in Mercator projection, angular relationships (e.g., directions) between landmasses are preserved at the expense of distorting shape or area of these landmasses. In Albers projection, for example, areas of the landmasses are preserved at the expense of distorting shapes and angular relationships of the landmasses. Therefore, each map has its own benefits and drawbacks, and is only suited for a particular purpose.

Conventional commonly used maps may be generally unfit for today's use patterns. For example, there can be multitude of routes to go from point A to point B on a map. Each route has some associated cost functions that are not reflected in the map. For instance, a user may want to drive from point A to point B in fastest time (e.g., the cost function being time). This user might to pick a route based on a shortest distance between point A to point B. However, this user might not know that the route with the shortest distance has a difficult terrain and thus generally takes a longer time to drive. Therefore, in this instance, distance can be a non-ideal indicator of time to drive from point A to point B. In some instances, the user may want to drive from point A to point B in a most scenic route (e.g., the cost function being a scenery associated a route). In this instance, no such map exists that allows the user to judge which route to take. The user can choose an ideal route based on prior experiences or by word of mouth.

In another example, the majority of the world's economic activities can be localized to certain regions. For instance, most of the world's human capital are concentrated in city centers, and most of the world's transport/logistic activities are concentrated around major ports. Because the current suite of maps gives equal weight to areas or square-miles, these maps tend not to be useful in monitoring these economic activities. For example, a map depicting maritime activities around a seaport. In this example, there may be areas in which maritime activities are highly concentrated and areas that lack meaningful maritime activities. Because the current suite of maps gives equal weights to areas, there can be regions on the maps in which maritime activities are difficult to discerns and regions on the map in which maritime activities are so lacking that there is no need to monitor. As such, the current suite of maps or map projections are unsatisfying in monitoring the world's economic activities.

A claimed solution rooted in computer technology overcomes problems specifically arising in the realm of computer technology. In various embodiments, a map projection system can provide alternative map projections of existing geographical information (e.g., points of interests, angular relationships, routes, cost function, etc.) from one representation to another representation. The alternative map projections can be based on a cost function. In some embodiments, the cost function can be user selectable. For example, the user can select a map projection based on time or scenery associated with routes. In some embodiments, the alternative map projections can be based on a spatial function. For example, the spatial function can be a region of interest (e.g., economic activities, maritime activities, etc.) for which a user has incentives to monitor the region of interest. In general, the map projection system can represent existing geographical information in a way that users can readily digest, comprehend, and make decisions based on an alternative map projection of the existing geographical information. The map projection system is discussed in further detail herein with respect to FIG. 1.

FIG. 1 illustrates an example map projection system 100, according to various embodiments of the present disclosure. The example map projection system 100 can include one or more processors and memory. The processor(s) can be configured to perform various operations by interpreting machine-readable instructions. As shown in FIG. 1, in some embodiments, the map projection system 100 can include an alternative map projection engine 102. The alternative map projection engine 102 can include a cost function projection engine 104 and a spatial function projection engine 106. In some embodiments, the map projection system 100 may also include at least one data store 120 that is accessible to the alternative map projection engine 102.

In various embodiments, the map projection system 100 can be configured to provide alternative map projections of existing geographical information from one representation to another representation. For example, the map projection system 100, via the alternative projection map engine 102, can project points of interest from a conventional two dimensional map to a different representation such that the points of interests are optimized over a cost function or a spatial function. The cost function can be any entity, parameter, or geographical information that a user can derive a value. For instance, a cost function of a map projection can be associated with time (e.g., quickest route to get from one location to another location). The cost function of the map projection, in some instances, can be associated with scenery of routes (e.g., most scenic route from one location to another location). The cost function of the map projection can be based on terrain difficulty of routes (e.g., difficulty of routes from one location to another location). The cost function of the map projection can also be based on monetary incentives (e.g., coffee shops with cheapest price for coffee). The spatial function can be any entity, region of interest, or geographical information that a user desires to view in further detail. For instance, the spatial function of a map projection can be associated with a distance that is of interest to the user (e.g., regions around transportation/logistics hubs). The spatial function of the projection can be associated with concentration or density around a region of interest (e.g., population density, concentration of transportation vessels, etc.).

In some embodiments, the cost function projection engine 104 can be configured to provide alternative map projections of exiting geographical information from a conventional two dimensional map into another representation based on a cost function. The cost function projection engine 104 can repurpose an existing map from one representation to another representation for which a user can easily digest, comprehend, and make decisions based on the exiting geographical information optimized over the cost function the user desires. More details of the cost function projection engine 104 are discussed herein with respect to FIG. 2A.

The spatial function projection engine 106, in some embodiments, can be configured to provide alternative map projections of exiting geographical information from a conventional two dimensional map into another representation based on a spatial function. The spatial function projection engine 106 can repurpose an existing map from one presentation to another representation for which a user can readily digest, comprehend, and make decisions based on the existing geographical information optimized over the spatial function the user desires. More details of the spatial function projection engine 106 are discussed herein with respect to FIG. 2B.

In some embodiments, the at least one data store 120 can be configured to store various geographical information (e.g., points of interest, regions of interest) and various other information related to the geographical information. For example, the at least one data store 120 can store angular direction, time estimation, scenic value, terrain difficulty, and economic incentive information associated with the points of interests. In another example, the at least one data store 120 can store concentration or density data associated with regions of interest associated with a map. In some embodiments, the at least one data store 120 can interface with the alternative projection engine 102 to store various map projections of geographical information and various other information related to the projections.

Figure 2A:
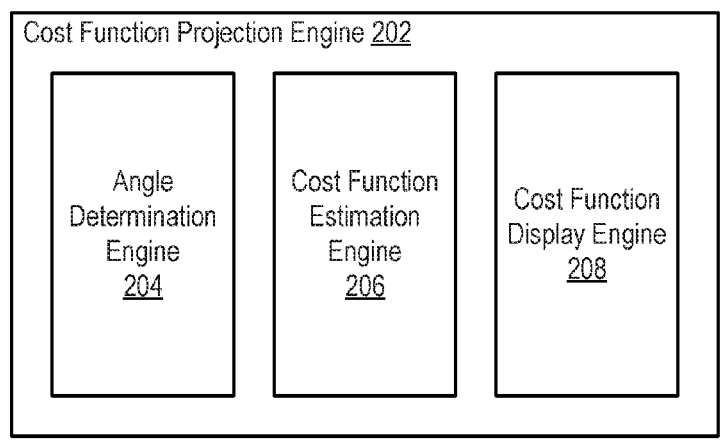
FIG. 2A illustrates an example cost function projection engine, according to various embodiments of the present disclosure.

FIG. 2A illustrates an example cost function projection engine 202, according to various embodiments of the present disclosure. In some embodiments, the cost function projection engine 104 of FIG. 1 can be implemented as the cost function projection engine 202. As shown in FIG. 2A, in some embodiments, the cost function projection engine 202 can include an angle determination engine 204, a cost function estimation engine 206, and a cost function display engine 208.

As discussed, the cost function projection engine 202 can be configured to provide alternative map projections of exiting geographical information from a conventional two dimensional map into another representation based on a cost function. The angle determination engine 204, in some embodiments, can be configured to determine relative angular relationships from a current location to neighboring points of interests on the map. For example, any two points of interest on the map can be related by an angle offset from a reference. The reference may be a vertical line (e.g., longitudinal line) or a horizontal line (e.g., latitudinal line) respect to one of the two points of interest. For instance, a first point of interest of the two points of interest may be 45 degrees north-east of a second point of interest of the two points of interest. In this instance, the 45 degree angle may be referenced vertically or horizontally to the second point of interest. In general, there may be one or more routes connecting the current location to the neighboring points of interest on the map. However, angles or angular relationships between the current location and the neighboring points of interest are always fixed. The angle determination engine 204, therefore, can determine and extract this angular relationships between the current location to the neighboring points of interest from the map. This angular relationship may be utilized later by the cost function display engine 208 to display various angles associated with the current location to the neighboring points of interests.

In some embodiments, the cost function estimation engine 206 can be configured to estimate cost functions associated with routes between points of interest on the map. As discussed, a cost function may be any parameter or entity that a user can derive value. In one embodiment, the cost function estimation engine 206 can determine travel times associated with routes between the points of interest. For example, there can be multiple routes of varying distance between point A and point B on a map. In this example, the cost function estimation engine 206 can determine approximate travel times from point A to point B for each of the multiple routes. Further, in determining the approximate travel time for each route, the cost function estimation engine 206 may factors in traffic conditions, number of traffic stops, difficulty of driving, etc. as part of its approximation. In various embodiments, these travel time estimates can be provided to the cost function display engine 208 for further assessment.

In another embodiment, the cost function estimation engine 206 can determine scenic values associated with routes between the points of interest. For example, there can be multiple routes to go from point A to point B, with each route having a certain scenic value to users. For instance, there can be two routes between point A and point B. Route one is a scenic mountainous drive while route two is a highway route. In this instance, the cost function estimation engine 206 may assign a higher scenic value to route one then to route two. Here, the scenic value indicates a level of scenery associated with a route. In various embodiments, these scenic values can be provided to the cost function display engine 208 for further assessment.

In another embodiment, the cost function estimation engine 206, can determine curvature of routes between the points of interest. For example, as in the example above, there can be two routes between point A to point B. Further, route one is a curvy mountainous route while route two is a relatively straight highway route. In this example, the cost function estimation engine 206, if a user attaches some value to driving on a curvy road (e.g., a user driving a sports car on a Sunday morning), can determine relative curvature of the two routes and assign a curvature value indicating a degree of curvature associated with a route. In various embodiments, these curvature values can be provided to the cost function display engine 208 for further assessment.

In another embodiment, the cost function estimation engine 206 can determine terrain difficulty of routes between the points of interest. As with the previous example, route one is a mountainous route and route two is a highway route. In this example, the cost function estimation engine 206 can determine terrain difficulty and assign a terrain difficulty value indicating degrees of terrain difficulty associated with a route. In various embodiments, these difficulty values can be provided to the cost function display engine 208 for further assessment.

In some embodiments, the cost function estimation engine 206 can determine a cost function between a plurality of equivalent points of interests from a point of interest. In one embodiment, the cost function estimation engine 206 can determine approximate travel times from the point of interest to the plurality of equivalent points of interests. For example, there can be a plurality of hospitals from a current location. In this example, the cost function estimation engine 206 can determine approximate travel times from the current location to the plurality of hospitals. In another embodiment, the cost function estimation engine 206 can determine economic incentive from the point of interest to the plurality of equivalent point of interests. For example, there can be a plurality of coffee shops around the current position. Each coffee shop offers different coffee prices. In this example, the cost function estimation engine 206 can determine relative prices of coffee prices and assigns routes to each coffee shop with an economic incentive value indicting price of coffee. Many variations are possible and many variations are contemplated. For example, the cost function estimation engine 206 can compute a cost function between the point of interest and the plurality of equivalent points of interest based on scenic value, curvature value, or terrain difficulty value, etc. In various embodiments, the cost function estimation engine 206 can interface with the cost function display engine 208 for further assessment.

In various embodiments, the cost function display engine 208 can be configured to project geographical information belong to a plurality of points of interest from one representation to another representation based on a cost function. In some embodiments, the cost function display engine 208 can interface with the angle determination engine 204 to receive angular relationship information between the points of interest. In some embodiments, the cost function display engine 208 can interface with the cost function estimation engine 206 to receive cost function information between the points of interests. The cost function display engine 208 can combine the angular relationship information and the cost function information between the points of interest, and project the combined information as vectors emanating or originating from the point of interest to the plurality of the points of interest in another representation. Here, directions associated with the vectors are based on angular relationships between the points of interest and magnitudes of the vectors are based on the cost functions associated with routes between the points of interest. Multiple routes can be included, and colors can be used to compare different costs across many routes to the same set of destinations. Details of cost function display engine 208 are further discussed herein with respect to FIGS. 3A and 3B.

In some embodiments, the cost function display engine 208 can include visual indicators that help users interpret the magnitudes of the vectors. The visual indicators can include one or more concentric intervals about a point of interest, with each successive concentric interval indicating a greater number. For example, if a cost function is time, the concentric intervals represent units of time. For instance, the units of time can be seconds, minutes, hours, days, or any other suitable unit of time. In another example, if the cost function is scenic value, the concentric intervals represent progressive levels of scenic or beauty. In another example, if the cost function is road curvature, the concentric intervals present progressive levels of road curvature. In another example, if the cost function is terrain difficulty, the concentric intervals represent progressive levels of terrain difficulty. These visual indicators can be displayed together separated by a visual indicator, such as color, to visualize the relative scores for the best paths between locations, or the costs may be combined into a single composite score. Many variations are possible.

Figure 2B:
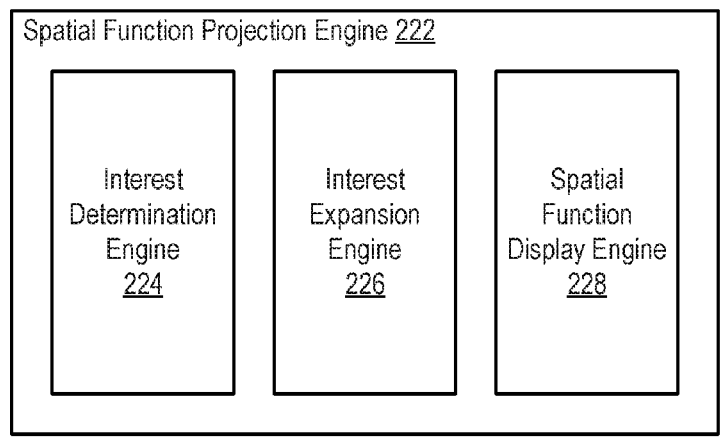
FIG. 2B illustrates an example spatial function projection engine, according to various embodiments of the present disclosure.

FIG. 2B illustrates an example spatial function projection engine 222, according to various embodiments of the present disclosure. In some embodiments, the spatial function projection engine 106 of FIG. 1 can be implemented as the spatial function projection engine 222. As shown in FIG. 2B, in some embodiments, the spatial function projection engine 222 can include an interest determination engine 224, an interest expansion engine 226, and a spatial function display engine 228.

As discussed, the spatial function projection engine 222 can be configured to provide alternative map projections of exiting geographical information from a conventional two dimensional map into another representation based on a spatial function. The interest determination engine 224, in some embodiments, can be configured to determine a region of interest on a map. The region of interest can include any region on the map that has a high concentration of points of interest. The points of interest can be any entity that a user has incentives to gain more detailed information. For example, the points of interest can be shipping vessels, cargo airplanes, shipping trucks/trains, or populations density of humans or animals, etc. In some embodiments, the interest determination engine 224 can identify regions of interest around transport/logistic hubs (e.g., seaports, airports, shipping hubs, etc.) that are of importance for logistics companies. For example, for maritime tracking, the region of interest may be areas around coastlines of a landmass. In another example, for air traffic control, the region of interest may be areas around major airports. In another example, for truck and train tracking, the region of interest may be trucking hubs and trains stations. In some embodiments, the region of interest can be associated with regions that have high populations densities.

In some embodiments, the interest determination engine 224 can define a spatial function that includes a threshold distance or amount that encompasses a majority of the points of interests. For example, for maritime tracking, the spatial function can be a threshold distance away from a coastline that includes majority of maritime activity associated with the coastline. In some embodiments, this threshold distance can be determined or measured empirically. In some embodiments, this threshold distance can be determined using various clustering algorithms. In another example, for air traffic control, the spatial function can be a threshold radial distance from an airport for which high number of airplanes are entering and exiting. In another example, for truck and train tracking, the spatial function can be a threshold distance around trucking hubs or train stations for which a majority of trucks and trains enter and exit. In some embodiments, the interest determination engine 224 can define the spatial function to be some threshold amount of area in which a majority of populations are encompassed by the threshold amount of area. For example, a region of interest for San Francisco may include neighboring Main, Contra Costa, Alameda, and Santa Clara counties. In some embodiments, a special function may be entirely dynamic and driven by the current positions of all sensors on a moving fleet of moving entities, and may be recomputed periodically to adjust with the density of the fleet.

Once a region of interest has been identified by the interest determination engine 224, in some embodiments, the interest expansion engine 226 can be configured to expand the region of interest according to the spatial function defined. The interest expansion engine 206 can expand the region of interest as defined by the spatial function such that points of interest that are inside the region of interest occupy a greater portion of the map based on the alternative map projection. Further, in response to the expansion of the region of interest, other regions on the map contract in proportion to an amount the region of interest expanded so the overall scale of the map does not change from one representation to another representation. For example, for maritime tracking, the interest expansion engine 226 can expand a region of interest (e.g., a region of high interest) by expanding a threshold distance from a coastline. This region can be expanded to reveal details of shipping vessels along the coastline. In this example, regions other than the region of interest (e.g., a region of low interest) contract in response to the expansion. In another example, for air traffic control, the interest expansion engine 226 can expand a region defined by a threshold radial distance around an airport (e.g., a region of high interest) while contracting regions outside the region of interest (e.g., a region of low interest). In some embodiments, the interest expansion engine 226 can expand cities (e.g., a region of high interest) while contracting areas outside the cities (e.g., a region of low interest). In such embodiments, the interest expansion engine 226 can expand, on a new projection of a two dimensional map, details of city streets at the expense of obfuscating roadways outside the cities.

In some embodiments, the spatial function display engine 228 can be configured to maintain proper proportions on a new representation of a map after geographical information is projected from one representation to the new representation. The spatial function display engine 228 can interface with the interest expansion engine 226 to determine regions of interest to be expanded in this new representation of the map. In response to the expansion of the regions of interest, the spatial function display engine 228 can contract other regions such that overall scale of the new representation of the map is consistent with a previous representation of the map. Details of spatial function display engine 228 are discussed herein with respect to FIGS. 4A and 4B.

Figure 3A:
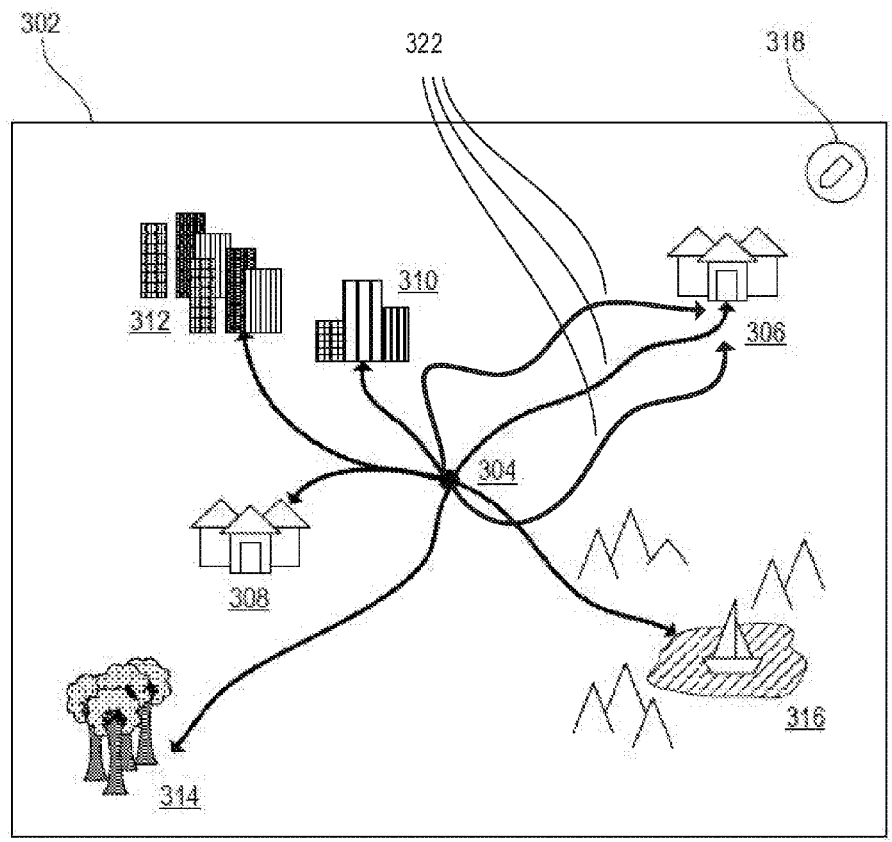
FIG. 3A illustrates an example graphic user interface, according to various embodiments of the present disclosure.

FIG. 3A illustrates an example graphic user interface 300, according to various embodiments of the present disclosure. In the example graphic user interface 300, there can be a display 302 on a computing device. A conventional two dimensional map can be presented on the display 302 of the computing device. Further, on the display 302, there can be an option 318 that allows a user to toggle between the conventional two dimensional map and an alternative map projection of the conventional two dimensional map, in which geographical information of the map are projected based on a cost function.

In the example graphic user interface 300, the conventional two dimensional map depicts a plurality of points of interests. The plurality of the points of interest includes a current location 304, a first residential community 306, a second residential community 308, a first downtown 310, a second downtown 312, a forest 314, and a lake 316. In this example graphic user interface 300, the current location 304 is presented centrally on the display 302 while other points of interest are peripherally presented round the current location 304. Further, in this example graphic user interface 300, there is a route or a road connecting the current location 304 to each of the other points of interests. Moreover, relative lengths of routes or roads between the current location 304 and the other points of interest represent relative distances from the current location 304 to the other points of interest. For example, the first residential community 306 is further away or more distant from the current position 304 than the second residential community 308 is to the current location 304. In another example, the second downtown 312 is further away from the current location 304 than the first downtown 310 is to current location 304. Likewise, as depicted in this example graphic user interface 300, the forest 314 is further away from the current location 304 than the lake 316.

As discussed, approximating travel times based on the conventional two dimensional map, often time, can be inaccurate. For example, a user might, based on relative distances, determine that time to travel from the current location 304 to the second residential community 308 is faster than to travel from the current location 304 to the first residential community 306. In this example, the conventional two dimensional map does not show relative traffic conditions from the current location 304 to the first residential community 306 and to the second residential community 308. Without this additional information, the user might choose to travel to the second residential community 308 over the first residential community 306 thinking it would be faster. In another example, the user might determine that time to travel from the current location 304 to the lake 316 is faster than to travel from the current location 304 to the forest 314 based on their relative distances. In this example, the conventional two dimensional map does not show that the route to the lake is a mountainous route with curvy roads and difficult terrain. Therefore, although the distance between the current location 304 to the lake 316 is shorter, actual travel time is much longer than the travel time from the current location 304 to the forest 314. In some instances, there may be multiple routes for reaching a given destination. For example, as shown in FIG. 3A, there are multiple routes 322 for reaching the first residential community 306. For reasons discussed above, approximating travel times for reaching the first residential community 306 based on these multiple routes 322 can also be inaccurate when relying on the conventional two dimensional map shown in FIG. 3A.

A better approach is to provide users with an alternative map projection scheme in which the points of interest are projected from the conventional two dimensional map into a new representation of the two dimensional map. In the new representation, the points of interest are based on time (e.g., cost function). To do so, in this example graphic user interface 300, a user can press, touch, or interact with the option 318 to view the new representation of the two dimensional map based on time.

Figure 3B:
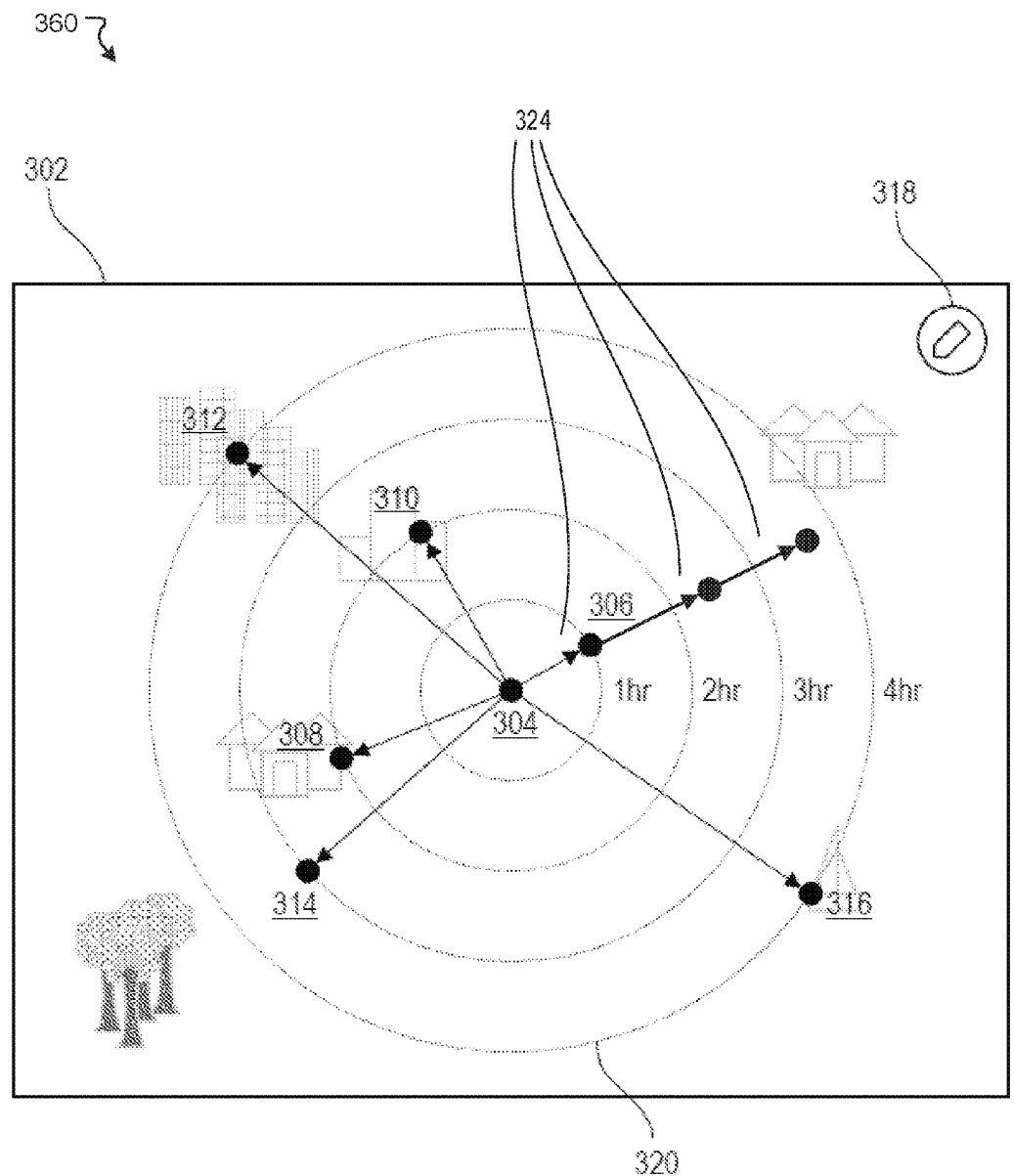
FIG. 3B illustrates an example graphic user interface based on a temporal projection, according to various embodiments of the present disclosure.

FIG. 3B illustrates an example graphic user interface 360 based on a temporal projection, according to various embodiments of the present disclosure. In this example graphic user interface 360, the user has pressed, touched, interacted with the option 318 to view the new representation of the two dimensional map based on time. In this example, there can be a plurality of concentric overlays presented on the display 302 of the computing device. Each concentric overlay 320 represents a unit of time. For example, in the example graphic user interface 360, each concentric overlay equals an hour of time. Further, in this example, routes from the current location 304 to the other points of interest are projected to the new representation as vectors emanating from the current location 304. Each vector has a direct and a magnitude. The direction is preserved from the angular relationship between the current location 304 to a target point of interest from the conventional two dimensional maps shown in FIG. 3A. The magnitude is the time estimation from the current location 304 to the target point of interest. For example, in the example graphic user interface 360, the "routes" from the current location 304 to the first residential community 306 are represented by respective vectors 324 that each represent one route for reaching the first residential community 306. Each vector has a direction corresponding to the angular direction depicted on the conventional two dimensional map. Each vector also has a magnitude corresponding to the travel time from the current location 304 to the first residential community 306. For instance, in this example, the travel time from the current location 304 to the first residential community 306 using a first route is one hour. The temporal projection also shows vectors 324 corresponding to a second route and a third route for reaching the first residential community 306. In this example, the travel time from the current location 304 to the first residential community 306 is over two hours when using the second route and over three hours when using the third route. In some embodiments, rather than showing vectors corresponding to all routes for reaching a given destination, the temporal projection can show vectors corresponding to some of those routes. For example, the temporal projection can show vectors corresponding to the top three popular routes for reaching a destination. Likewise, the vector from the current location 304 to the second residential community 308 has a direction that correspond to the direction depicted on the conventional two dimensional map and a magnitude that equals to the travel time between the two points of interest. In this example, the travel time, or the magnitude, is longer because the route from the current location 304 to the second residential community 308 has more traffic than the route from the current location 304 to the first residential community 306.

Figure 4A:
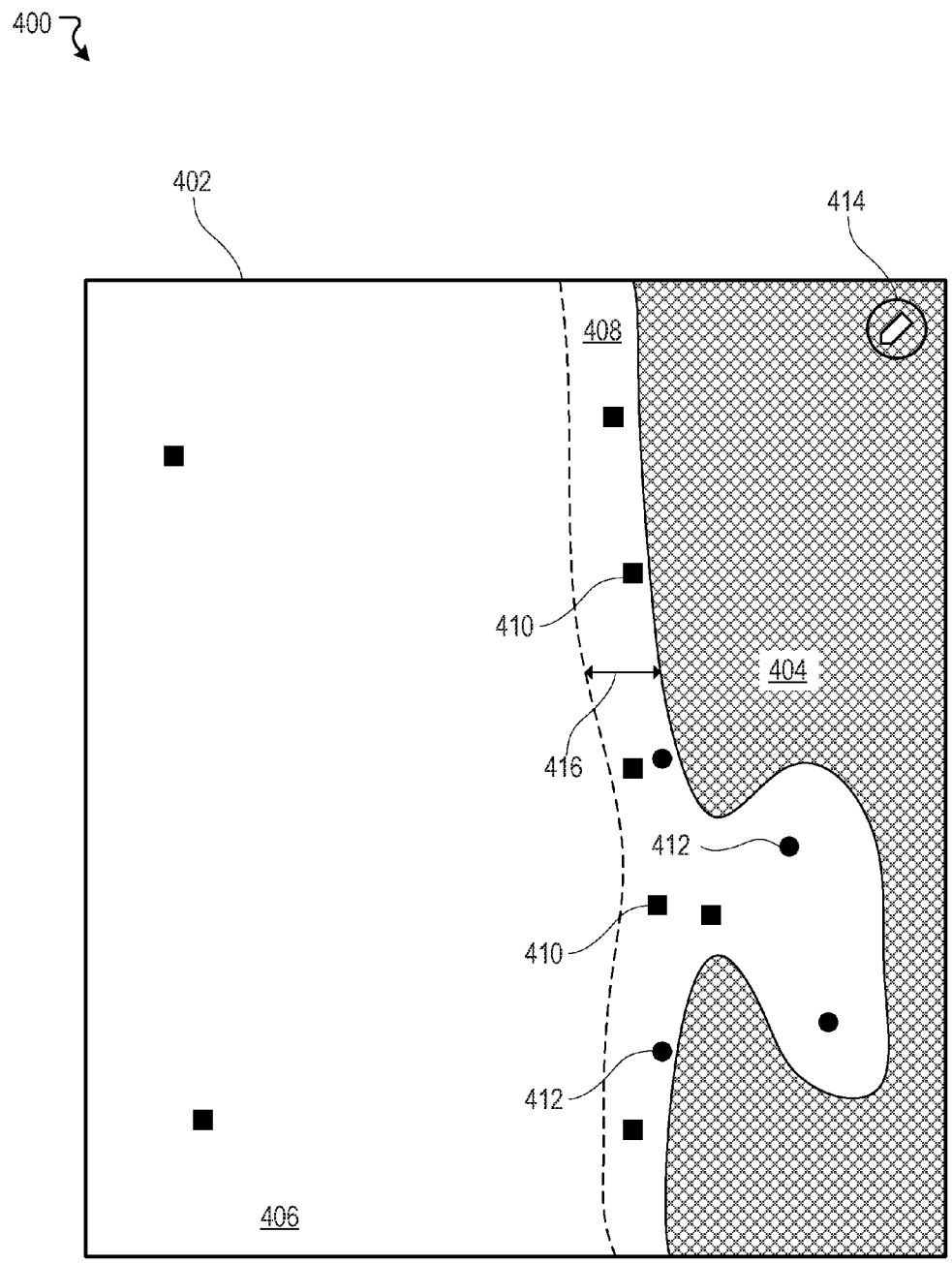
FIG. 4A illustrates an example graphical user interface, according to various embodiments of the present disclosure.

FIG. 4A illustrates an example graphical user interface 400, according to various embodiments of the present disclosure. In the example graphic user interface 400, there can be a display 402 on a computing device. A conventional two dimensional map can be presented on the display 402 of the computing device. Further, on the display 402, there can be an option 414 that allows a user to toggle between the conventional two dimensional map and an alternative map projection of the conventional two dimensional map, in which geographical information of the map are projected based on a spatial function.

In the example graphic user interface 400, the conventional two dimensional map depicts a landmass 404, a body of water 406, shipping vessels 410, and recreational vessels 412. Further, in the example graphic user interface 400, there can be a region of interest 408 that runs along a coastline of the landmass 404, defined by a threshold distance 416 (e.g., a spatial function) away from the coastline. As shown in the example graphic user interface 400, majority of maritime activity occurs along the coastline of the landmass 404 and within the region of interest 408. Because the conventional two dimensional map gives equal distance weight to various regions, there can be regions of high vessel density and regions of low vessel density. As such, the conventional two dimensional map is not useful in maritime tracking shipping along the coastline.

A better approach is to provide users with an alternative map projection scheme in which the points of interest (e.g., shipping vessels 410 and recreational vessels 412) are projected from the conventional two dimensional map into a new representation of the two dimensional map. In the new representation, the points of interest are optimized over the spatial function. In this example graphic user interface 400, a user can press, touch, or interact with the option 414 to view the new representation of the two dimensional map based on threshold distance from the coastline.

Figure 4B:
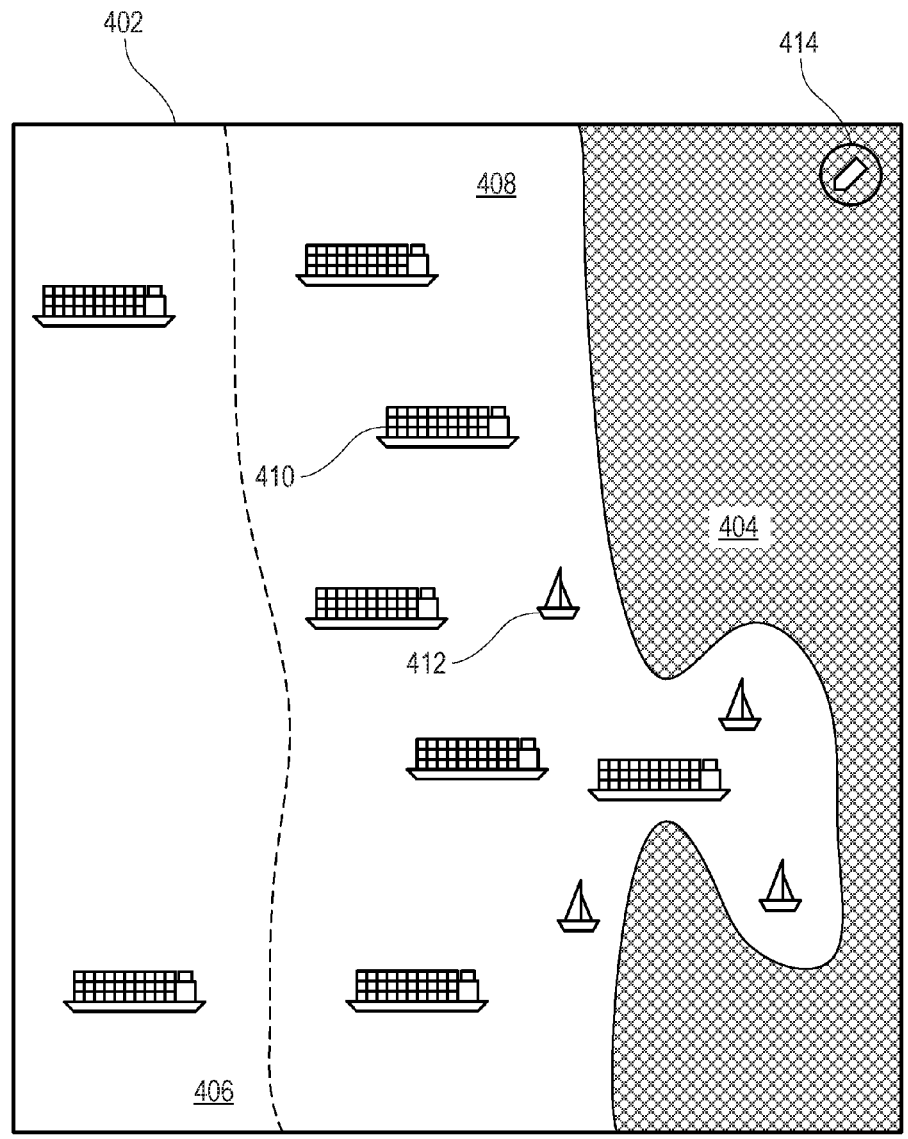
FIG. 4B illustrates an example graphic user interface based on a spatial projection, according to various embodiments of the present disclosure.

FIG. 4B illustrates an example graphic user interface 460 based on a spatial projection, according to various embodiments of the present disclosure. In this example graphic user interface 460, the user has pressed, touched, interacted with the option 414 to view the new two dimensional map based on the threshold distance from the coastline. In this example, the region of interest 408 has expanded to take up majority of the map. Areas outside of the region of interest 408 are contracted proportionally to an amount the region of interest 408 expanded. Further, in this example, since the region of interest 408 can be expanded, the shipping vessels 410 and recreational vessels 412 have more space on the new representation of the two dimensional map to determine relative distances between the shipping vessels 410 or the recreational vessels 412 to the coastline as well as to determine relative distances to other vessels.

Figure 5A:
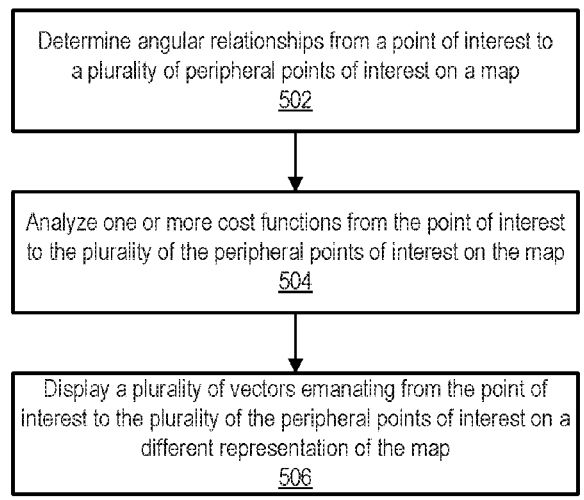
FIG. 5A illustrates an example method, according to various embodiments of the current disclosure.

FIG. 5A illustrates an example method 500, according to various embodiments of the current disclosure. The method 500 may be implemented in various systems including, for example, the map projection system 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, angular relationships from a point of interest to a plurality of peripheral points of interest can be identified on a map. At block 504, one or more cost functions from the point of interest to the plurality of the peripheral points of interest can be analyzed on the map. At block 506, a plurality of vectors emanating from the point of interest to the plurality of the peripheral points of interest can be displayed on a different representation of the map.

Figure 5B:
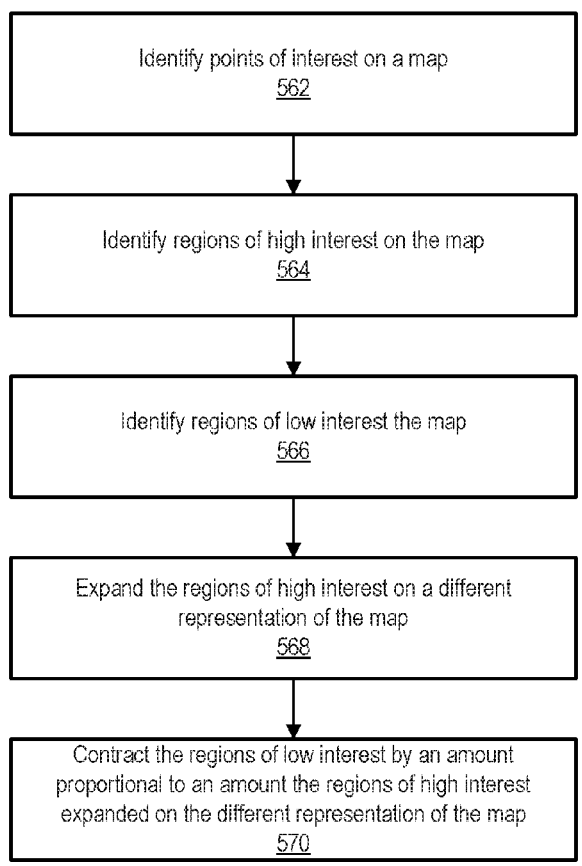
FIG. 5B illustrates an example method, according to various embodiments of the current disclosure.

FIG. 5B illustrates an example method 560, according to various embodiments of the current disclosure. The method 560 may be implemented in various systems including, for example, the map projection system 100 of FIG. 1. The operations of method 560 presented below are intended to be illustrative. Depending on the implementation, the example method 560 may include additional, fewer, or alternative steps performed in various orders or in parallel. The example method 560 may be implemented in various computing systems or devices including one or more processors.

At block 562, points of interest can be identified on a map. At block 564, regions of high interest can be identified on the map. At block 566, regions of low interest can be identified on the map. At block 568, the regions of high interest can be expanded on a different representation of the map. At block 570, the regions of low interest can be contracted by an amount proportional to an amount the regions of high interest expanded on the different representation of the map.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
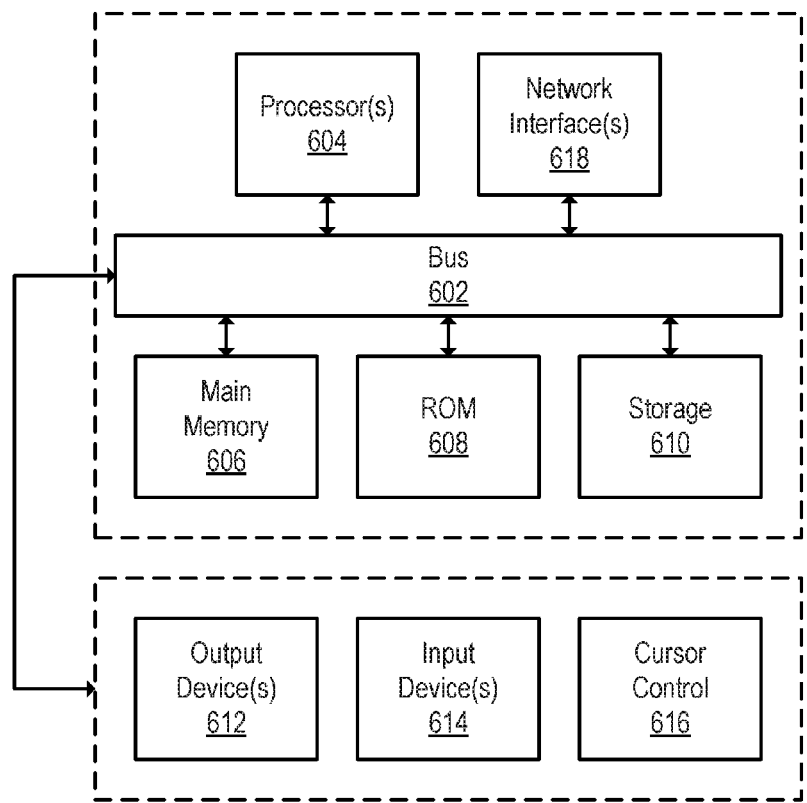
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method being implemented by a map projection system including one or more physical processors and storage media storing machine-readable instructions, the method comprising:
    identifying, by the map projection system, points of interest on a map;
    identifying, by the map projection system, a region of high interest on the map;
    identifying, by the map projection system, a region of low interest on the map; and
    generating, by the map projection system, a new representation of the map, wherein generating the new representation of the map comprises:
        expanding the region of high interest on the new representation of the map; and
        contracting the region of low interest on the new representation of the map, wherein at least one of: i) a number of points of interest represented within the region of high interest is unchanged after expanding the region of high interest, or ii) a number of points of interest represented within the region of low interest is unchanged after contracting the region of low interest.

2. The method of claim 1, wherein the region of low interest is contracted by an amount proportional to an amount of expansion of the region of high interest.

3. The method of claim 1, wherein expanding the region of high interest on the new representation of the map comprises:
    determining a reference on the map;
    determining a threshold distance from the reference that encompasses a majority of the points of interest; and
    expanding a first area formed between the reference and the threshold distance on the new representation of the map.

4. The method of claim 3, wherein contracting the region of low interest on the new representation of the map comprises:
    contracting a second area on the new representation of the map that extends beyond the threshold distance.

5. The method of claim 3, wherein the reference is one of a geographical feature or a physical structure depicted in the map.

6. The method of claim 1, wherein expanding the region of high interest on the new representation of the map comprises:
    determining a threshold amount of area that encompasses a majority of the points of interest; and
    expanding the threshold amount of area on the new representation of the map.

7. The method of claim 1, wherein the points of interest include at least one of maritime vessels, airplanes, trucks, trains, or population.

8. The method of claim 1, wherein the region of high interest comprises at least a threshold number of the points of interest.

9. The method of claim 8, wherein one or more of the points of interest is a mobile entity that changes its location within the map, the method further comprising:
    periodically redetermining a number of the points of interest in the region of high interest;
    determining that the number of the points of interest in the region of high interest has fallen below the threshold number; and
    increasing a size of an area of the map corresponding to the region of high interest to increase the number of points of interest in the region of high interest.

10. The method of claim 1, wherein the region of low interest comprises less than a threshold number of the points of interest.

11. A map projection system, comprising:
    a memory storing machine-executable instructions; and
    a processor configured to access the memory and execute the machine-executable instructions to:
        identify points of interest on a map;
        identify a region of high interest on the map;
        identify a region of low interest on the map; and
        generate a new representation of the map, wherein generating the new representation of the map comprises:
            expanding the region of high interest on the new representation of the map; and
            contracting the region of low interest on the new representation of the map, wherein at least one of: i) a number of points of interest represented within the region of high interest is unchanged after expanding the region of high interest, or ii) a number of points of interest represented within the region of low interest is unchanged after contracting the region of low interest.

12. The map projection system of claim 11, wherein the processor is configured to execute the machine-executable instructions to contract the region of low interest by an amount proportional to an amount of expansion of the region of high interest.

13. The map projection system of claim 11, wherein the processor is configured to expand the region of high interest on the new representation of the map by executing the machine-executable instructions to:
   determine a reference on the map;
   determine a threshold distance from the reference that encompasses a majority of the points of interest; and
   expand a first area formed between the reference and the threshold distance on the new representation of the map.

14. The map projection system of claim 13, wherein the processor is configured to contract the region of low interest on the new representation of the map by executing the machine-executable instructions to:
   contract a second area on the new representation of the map that extends beyond the threshold distance.

15. The map projection system of claim 13, wherein the reference is one of a geographical feature or a physical structure depicted in the map.

16. The map projection system of claim 11, wherein the processor is configured to expand the region of high interest on the new representation of the map by executing the machine-executable instructions to:
   determine a threshold amount of area that encompasses a majority of the points of interest; and
   expand the threshold amount of area on the new representation of the map.

17. The map projection system of claim 11, wherein the points of interest include at least one of maritime vessels, airplanes, trucks, trains, or population.

18. The map projection system of claim 11, wherein the region of high interest comprises at least a threshold number of the points of interest.

19. The map projection system of claim 18, wherein one or more of the points of interest is a mobile entity that changes its location within the map, and wherein the processor is configured to execute the machine-executable instructions to:
   periodically redetermine a number of the points of interest in the region of high interest;
   determine that the number of the points of interest in the region of high interest has fallen below the threshold number; and
   increase a size of an area of the map corresponding to the region of high interest to increase the number of points of interest in the region of high interest.

20. The map projection system of claim 11, wherein the region of low interest comprises less than a threshold number of the points of interest.

* * * * *